April 9, 1929.      G. H. DAY      1,708,208
OPHTHALMIC MOUNTING AND METHOD
Filed Sept. 14, 1925
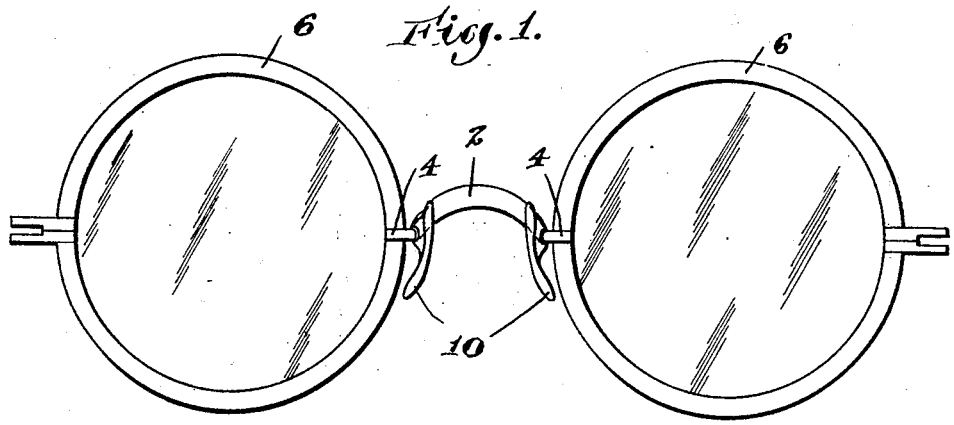
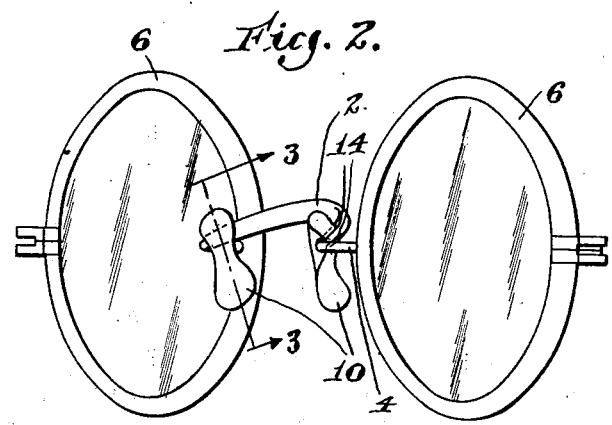
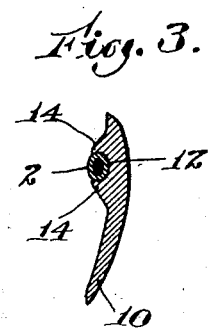
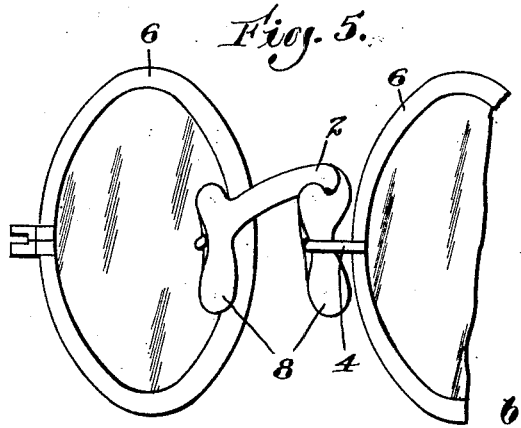
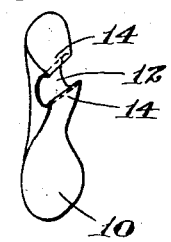
Inventor
George H. Day
by David Rines
Attorney Patented Apr. 9, 1929.

1,708,208

UNITED STATES PATENT OFFICE.

GEORGE H. DAY, OF ROCHESTER, NEW YORK, ASSIGNOR TO BAUSCH AND LOMB OPTICAL COMPANY, OF ROCHESTER, NEW YORK, A CORPORATION OF NEW YORK.

OPHTHALMIC MOUNTING AND METHOD.

Application filed September 14, 1925. Serial No. 56,110.

The present invention relates to ophthalmic mountings and to methods of making the same.

Ophthalmic mountings of a type in common use are provided with a bridge comprising a tubular non-metallic member through which extends a reinforcing metal member. The bridge rests on the wearer's nose to hold the lenses properly in position before the eyes. It has heretofore been considered to be impracticable to supplement the holding action of bridges of this type with nose guards.

An object of the invention, therefore, is to improve upon ophthalmic mountings of the above-described character. A further object is to provide a new and improved nose guard. Still another object is to provide a new and improved combined nose guard and bridge, together with a method of making the same. Other and further objects will be explained hereinafter, and will be particularly pointed out in the appended claims.

To the attainment of these ends, a feature of the invention resides in providing the tubular, non-metallic bridge member with non-metal guards. These guards may be formed in one piece with the tubular member, or the guards and the tubular member may be formed of separate members, integrally united together. The latter is preferable, as it enables the invention to be used in connection with ophthalmic mountings of standard design.

The invention will now be explained in connection with the accompanying drawings, in which Fig. 1 is a rear elevation of a spectacle frame constructed according to a preferred embodiment of the present invention, the temples being omitted for clearness; Fig. 2 is a perspective of the same; Fig. 3 is a section taken upon the line 3—3 of Fig. 2, looking in the direction of the arrows; Fig. 4 is a perspective of the improved guard of the present invention; and Fig. 5 is a perspective similar to Fig. 2 of a modification, a part being broken away.

The invention is illustrated in the accompanying drawings in connection with a specific type of spectacle frame, having a specific type of bridge, but it will be understood that this is for illustrative purposes only, as the invention may be equally well practiced with eyeglass or other frames and with other types of bridges. The bridge is constituted of a non-metallic, tubular bridge member 2 adapted to rest upon the wearer's nose and through which extends a metal reinforcing bridge member 4 the ends of which are soldered or otherwise secured to the rims 6 of the spectacle frame. The rims 6 are of metal, covered by non-metallic material. The non-metallic material of the rim coverings and of the tubular bridge member 2 is usually zylonite, celluloid and the like. Ophthalmic mountings of this character are of well known type and need not, therefore, be further described.

According to the present invention, nose guards are provided, preferably of the same non-metallic material. The nose guards may be in one piece with the tubular bridge member 2, struck out from a flat piece of non-metallic material and shaped, as shown at 8 in Fig. 5; or they may be separate therefrom. In the former case the reinforcing member may be inserted through the shaped non-metallic member, and the parts bent into final form. In the latter case, it is preferred to unite the guards integrally with the tubular bridge member, after the latter has already been shaped, so as to form, in effect, an integral structure, similar to the integral structure shown in Fig. 5. This separate-guard structure is advantageous in that it enables the invention to be used in connection with standard ophthalmic mountings such as above described and, furthermore, provides for the guards being positioned at various angles of adjustment. In the integral structure of Fig. 5, the adjustment is initially determined when the bridge structure is first made. The separate guards may be kept in stock by the dealer and applied in accordance with the facial characteristics of the individual purchaser.

The preferred embodiment of the invention comprises a nose guard having a portion 10 adapted to engage a side of the wearer's nose and a portion by means of which the guard may be attached to the tubular bridge member. The second-named portion is adapted to rest against a side of the bridge member 2 at 12 and is provided with two curved arms 14 adapted to engage around the bridge member 2 at the opposite side thereof. By lining the portions 12, 14 of the guard with acetone or other cement, and similarly lining the adjacent portions of the bridge member 2, or in any other desired manner, the bridge and the guard will be caused to unite integrally throughout their points of engagement. The guards may be slipped over the ends of the bridge member 2, rotated to the desired angular position of adjustment, and then permitted to become integrally united together. By suitable modification, of course, the guards may be mounted so as to pivot freely about the ends of the tubular member.

Other modifications will occur to persons skilled in the art, and such modifications are considered to be included within the spirit and scope of the invention, as defined in the appended claims.

What is claimed is:

1. A nose guard constituted of non-metallic material having a portion adapted to rest upon the nose of a wearer and a portion by which the guard is adapted to be attached to a bridge member of non-metallic material, the second-named portion being adapted to rest against a side of the bridge member and having two curved arms adapted to engage around the bridge member at the side opposite to the first named side, the guard being adapted to be cemented to the bridge member at the points of engagement therewith.

2. An ophthalmic mounting comprising a bridge having a curved surface and two guards, the guards each having a portion adapted to rest upon the nose of a wearer and a portion by which the guard is attached to the bridge, the second-named portion of each guard resting against a side of the bridge and having a curved arm engaging around the curved surface of the bridge at the opposite end, the second-named portion being integrally secured to the bridge.

3. An ophthalmic mounting comprising a bridge member and two guards, the bridge member and the guards being formed of non-metallic material, the guards each having a portion adapted to rest upon the nose of a wearer and a portion by which the guard is attached to the bridge member, the second- named portion of each guard resting against a side of the bridge member and having two curved arms engaging around the bridge member at the side opposite to the first-named side, the guards being integrally united to the bridge member at the points of engagement therewith.

4. An ophthalmic mounting comprising a bridge member adapted to rest upon the nose of a wearer and two guards, the guards each having a portion adapted to rest upon a side of the nose of the wearer and a portion by which the guard is attached to the bridge member, the second-named portion of each guard resting against a side of the bridge member and having an arm engaging around the bridge at the side opposite to the first-named side of the bridge member, and a reinforcing member extending through the bridge member.

5. An ophthalmic mounting comprising a bridge member adapted to rest upon the nose of a wearer and two guards, the bridge member and the guards being formed of non-metallic material, the bridge member being in the form of a closed tube, the guards each having a portion adapted to rest upon the side of the nose of the wearer and a portion by which the guard is attached to the bridge member, the second-named portion of each guard resting against a side of the bridge member and having two curved arms engaging around the bridge member at the side opposite to the first-named side of the bridge member, the guards being integrally united to the bridge member at the points of engagement therewith, and a metal member extending through the bridge member and the second named portions of the guards.

In testimony whereof, I have hereunto subscribed my name.

GEORGE H. DAY.